United States Patent [19]
Mayerhofer

[11] Patent Number: 5,529,482
[45] Date of Patent: Jun. 25, 1996

[54] DEVICE FOR THE MANUFACTURE OF A ZIP FASTENER

[76] Inventor: Friedrich Mayerhofer, Rolliweg 15, CH - 2543 Lengnau, Switzerland

[21] Appl. No.: 226,899

[22] Filed: Apr. 13, 1994

[30] Foreign Application Priority Data

Apr. 15, 1993 [EP] European Pat. Off. ............ 93810274

[51] Int. Cl.$^6$ ................................................ B29C 45/40
[52] U.S. Cl. .................... 425/545; 425/556; 425/577; 425/814; 425/DIG. 58
[58] Field of Search ................. 425/127, 129.1, 425/545, 814, 556, DIG. 58, 577

[56] References Cited

U.S. PATENT DOCUMENTS

| | | |
|---|---|---|
| 2,529,091 | 11/1950 | Lester . |
| 3,642,417 | 2/1972 | Von Holdt . |
| 4,019,711 | 4/1977 | Altenhof et al. ............. 425/DIG. 58 |
| 4,123,495 | 10/1978 | Abey . |
| 4,515,342 | 5/1985 | Boskovic ........................ 425/577 |
| 4,979,288 | 12/1990 | Mayerhofer . |
| 5,054,183 | 10/1991 | Mayerhofer . |
| 5,079,820 | 1/1992 | Mayerhofer . |
| 5,234,329 | 8/1993 | Vandenberg ..................... 425/577 |
| 5,281,127 | 1/1994 | Ramsey .......................... 425/DIG. 58 |

FOREIGN PATENT DOCUMENTS

| | | |
|---|---|---|
| 248261 | 4/1947 | Switzerland . |
| 1551535 | 8/1979 | United Kingdom . |

*Primary Examiner*—Tim Heitbrink
*Attorney, Agent, or Firm*—Marks & Murase

[57] ABSTRACT

The manufacture of slit-type zip fasteners is accelerated by synchronizing the movement of the slit former with the movement of the ejector. A portion of the slit former slides while ejecting the product or closing the mould in a guide which causes a movement of the slit forming portion of the slit former obliquely to the general ejection direction thus pulling the slit forming portion out of the heads of the zipper teeth. The zip fastener is made preferably in a mould wherein the slider that comprises inter alia the moulds for the zipper stops is disposed asymmetrically at one end of the mould. The hot runner of this mould is designed in such a manner that the material flow is first directed to the feed nozzle furthest away from the slider and then to the nozzle next to the slider which is working for the injection moulding of a zip fastener of any length. This measure guarantees that the material above the inactive nozzles is permanently exchanged and that aging and decomposition processes of materials otherwise remaining in the hot runner are avoided.

7 Claims, 4 Drawing Sheets

DEVICE FOR THE MANUFACTURE OF A ZIP FASTENER

FIELD OF THE INVENTION

The present invention relates to a process for the manufacture of zip or slide fasteners by the technique of injection moulding. In particular, the invention refers to a method for the manufacture of at least one tape of a zip fastener.

The invention further relates to a device or machine for making zip fasteners.

The invention finally concerns a special injection mould to be used with advantage in the process and the device.

BACKGROUND OF THE INVENTION

Zip fasteners are manufactured at a large scale typically by injection moulding from synthetic, thermoplastic materials. In order to reach a high production rate, it is most desirable to manufacture the zip fasteners in as few injection steps as possible, and best in a single injection step, and to obtain different lengths of the zippers within the same tool and without great complications. Another requirement of tools for injection moulding of zip fasteners is that so-called slit-type zip fasteners can be produced. Slit-type zip fasteners are zippers whose teeth have a slit at their heads and a corresponding projection at their base, said projection meshing with a slit in a tooth of the opposite zip fastener tape when the zip fastener is closed. A slit-type zip fastener therefore has an increased strength, and the teeth are secured against lateral pushing-out.

An appropriate tool for this manufacturing mode is disclosed in EP-0,356,600. The mould described therein consists of two tape moulds arranged symmetrically at the left and the right of a slider for two rows of teeth each which are directly moulded on zipper supporting tapes laid into the mould. The slider functions in a first position for providing moulds for the upper and lower stops, also called top and bottom stops, respectively, and in a second position, to be applied to longer zippers, for combining the right and the left mould halves to define a continuous mould for a long zipper tooth chain.

Slit formers having the shape of long strips and a section corresponding to a beveled U are furthermore disposed in the right and the left tape mould. During injection, the slit formers are pushed by a pressing wedge against the tooth moulds thus resulting in the projection of one leg of the U into the moulds for the tooth heads, thus providing the injection mould of the slit. During the ejection of the injection moulded zip fastener tapes, the tooth moulds and simultaneously the slit formers are lifted with respect to the base of the mould. The slit formers loose therefore their contact with the pressing wedge and are pushed by springs out of the tooth slits so that the teeth and the attached zipper tapes can be taken out of the mould.

However, the very pushing out by the action of springs constitutes a particularly problematic aspect of the known construction. It is important for the tape moulds that the slit formers can uniformly slide out of the slits over the whole length of the tape. If this cannot be achieved, for example due to different spring forces over the length, or because the slit former adheres more strongly to the teeth at one end than at the other, or because not the entire length of the right and the left mould halves is used, the slit former may jam, and the mould must be remade fit to function by hand. A further disadvantage is the fact that the known device presents a relatively high limit for the lowest possible length of a zip fastener which can be injection moulded in this mould. This is due, on one hand, to the fact that the right and the left mould halves must be used to the same extent. For each mould half, the shortest possible length results from the position of the moulding nozzle for supplying the injection material into the mould which is closest to the slider. Since, however, the injection material is supplied centrally, about near the slider, non-used, heated material remains in the hot runner at nozzles far from the slider and which are shut down for the manufacture of short zip fasteners, and undergoes a decomposition process.

SUMMARY OF THE INVENTION

It is an object of the present invention to provide a new and useful method for the control of the slit moulding tool in a zip fastener injection mould for making slit-type zip fastener.

A further object is to provide such a method which allows a more rapid and a safer opening of the mould and release of the injection moulded product.

Still another object of the present invention is to provide an improved device for implementing the method of the invention.

And a further object of the invention is a new and improved injection mould for the manufacture of zip fasteners which will accelerate the production rate and avoid jamming of the slit former at the end of the manufacturing cycle.

Now, the first object of the invention is met by a method of the kind described above, wherein the slit former is moved in ejection direction when the tape is ejected from the mould after injection, the slit former further being pulled out of the teeth head slits by the action of a guide disposed obliquely to said ejection direction.

The above described mould which meets the second main object of the invention comprises an injection mould containing at least one row of moulds for shaping the teeth of a zip fastener and at least one slit former for shaping slits in the heads of the teeth, the mould further having a mould partition plane extending about centrally through the teeth, said at least one slit former comprising a slit shaping portion and furthermore a guide portion which is slidingly guided within a double acting guide element which is arranged within the injection mould obliquely to the ejection direction and complementarily to said guide portion of the slit former.

Thus, a slit former provided within the mould for the injection moulding of zip fasteners is inserted in and pulled out of the tooth moulds. The slit former comprises a strip having an L-shaped section, the angle between the base and the upright leg of the L being essentially different from 90°. A mould for a zip fastener tape comprises a row of moulds for teeth, i.e. for the joining members of the zip fastener, the supporting tape being inserted into the opened mould before injecting. The base of the slit former projects into the tooth moulds when the mould is closed. When the injection material is injected, teeth are formed whose bases enclose the support tape and whose heads will comprise a slit due to the base of the slit former which projects into the mould.

The leg of the slit former projects into a slot which is provided in the base of the mould extending obliquely to the mould opening plane and lengthwise the row of the tooth moulds, and this in such a manner that the leg of the slit former and thus the slit former itself are movable essentially only in a plane parallel to the slot plane. The mould opening plane goes about centrally through the tooth moulds.

The ejector which serves for the ejection of the injection moulding product in, say, an upward direction, presses during the opening of the mould also on the end of the slit former leg and pushes it upward too, and at the same time, the base of the slit former is forcedly extracted from the teeth since the said slot forces a lateral movement of the slit former. When the mould is closed, the slot forces the inverse movement of the slit former. The slit former is thus forced to be extracted from the tooth heads during ejection by the guiding effect of the slot and is also forcedly inserted into the tooth mould during the closure of the mould. These facts now allow a timely exact control of the movement of the slit former and thus of the ejection and the closure phase of the mould, and this permits to reach a considerable increase of the ejection speed without the risk of jamming.

A zip fastener injection mould which is preferred in this context presents the feature of permitting the injection moulding of zip fasteners of different lengths. In contrast to the current central slider, it comprises a slider at one end of the mould, for example at the right end. The entire tape mould, namely the mould for the zip fastener tapes, extends at the left of the slider, and at the right of the latter, only the catching moulds for the positioning of a second zip fastener which must only receive the stop elements by means of the mould in the slider, are disposed.

The preferred mould comprises two parallel rows of tooth moulds with the heads of the teeth being directed, analogous to the arrangement in the zip fastener, to the corresponding other row. The material supply conduit or gate runner which is partitioned on opening of the mould is disposed between the rows. This runner is connected via a number of nozzles to the hot runner which is arranged in one of the mould halves. The hot runner is designed in such a manner that the flow of material is first sent to the nozzle which is furthest away from the slider, and then gradually to nozzles nearer to the slider. Since the nozzle nearest to the slider is always active, it is guaranteed that, independently of the length of the zip fastener being produced, no injection material can stay in the hot runner during longer time periods. The fine adjustment of the length of the zip fastener may be effected by a slider displaceable within the gate runner.

The invention will now be described in more detail with an embodiment thereof and with reference to the drawings.

DETAILED DESCRIPTION OF THE INVENTION

Figure 1:
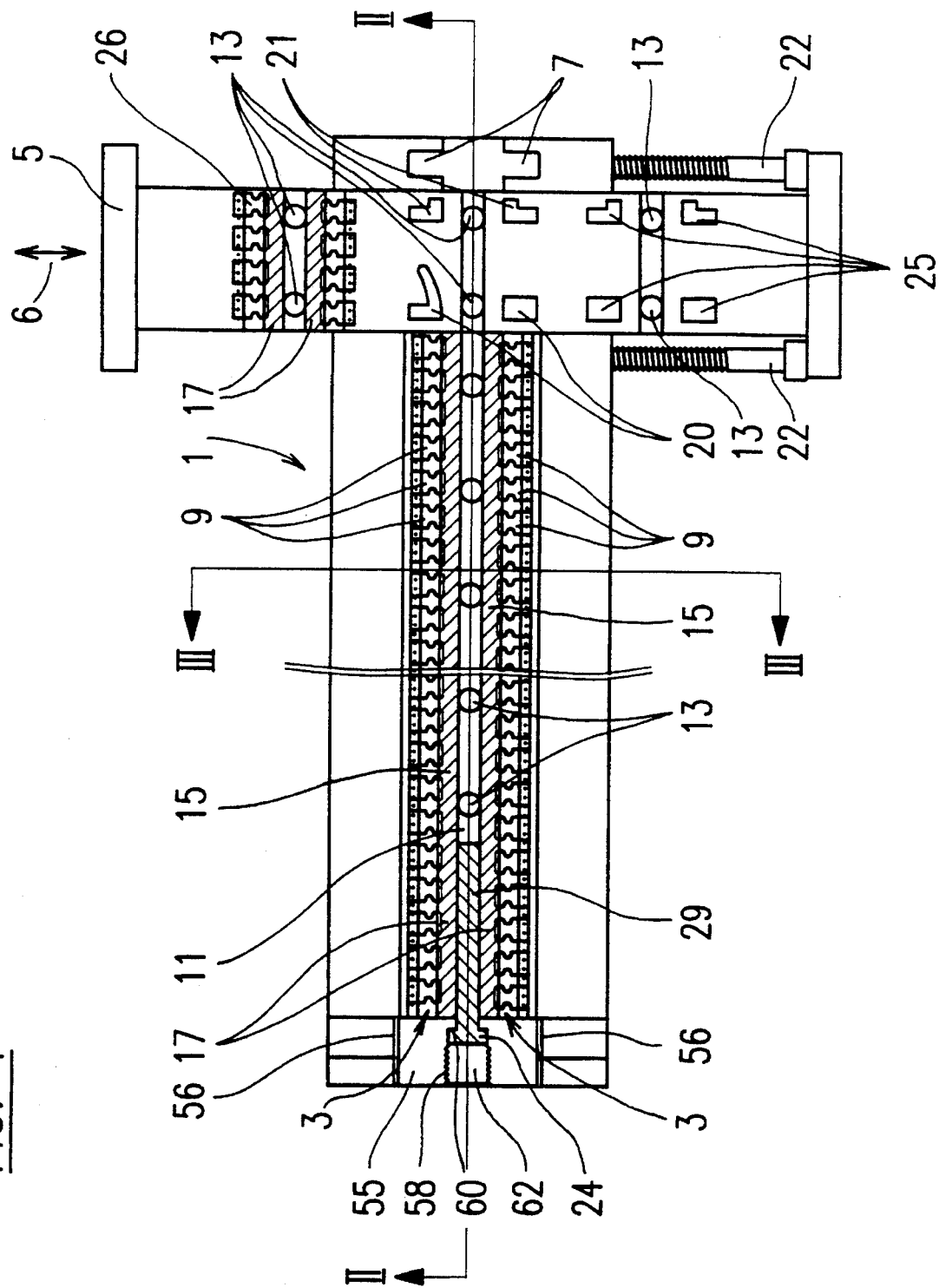
FIG. 1 shows a top view of the lower half of the injection mould according to the section line I—I in FIG. 2.

FIG. 1 shows a top view of the injection mould 1 according to the invention comprising the two tape moulds 3, the slider 5 and the positioning aids 7. The tape moulds each comprise a row of tooth moulds 9 and a longitudinally extending tape support 10 whereupon the zipper tape is laid and which serves for sealing against injection material that may leaking through or over the supporting tape. The gate runner 11 is arranged between the two tape moulds 3 having in its base the bores 13 for the central ejectors 45 which act on the sprue within the runner. The tooth moulds 9 may be directly incorporated into the basis of the lower mould half 1 or may be provided in special inserts which are inserted in the basis. The use of such inserts confers the advantage that they can be made from a material specially suitable for the injection moulding process, and that only the inserts have to be changed in the case of wear.

The slider 5 is arranged near to one end of the injection mould and can move according to the doubly pointed arrow 6. The slider 5 comprises in the present example three sets of moulds which serve as a prolongation of the tape moulds 3 for the production of the stop elements, or simply as a prolongation. In the position represented in FIG. 1, the slider 5 provides the moulds for the stop elements of a single open-end zip fastener, namely the moulds 20 for the banana and the box or the box adapter, respectively, and the moulds 21 for the so-called top stop elements.

This position of the slider 5 is defined by the abutment against the limit stop 22 in the form of screwed-in bolts which can be screwed until a defined position into the mould. If the limit stop 22 is removed, the slider 5 can be further introduced into the mould so that the second set of moulds 25 for stop elements arrives in the injection position. In the present example, these are moulds for the top and bottom stops of a closed-end zip fastener.

In the second, pre-established end position of the slider 5, simple prolongations 26 of the tape moulds are provided.

On the side of the slider 5 opposite to the tape moulds 3, positioning aids 7 are arranged. They serve to receive the last two teeth of a zip fastener in order to position the latter with respect to the moulds 21 of the top stops, thus enabling an injection moulding of these stops to the support tapes in the correct position.

The longitudinally displaceable length adapter 29 is arranged in the gate runner 11 and allows to adjust the length of the zip fastener to be produced, defined by the distance between the front end of the length adapter 29 and the slider 5 which represents the active length of the tape moulds 3. The length adapter 29 is guided in the upper mould half 30 as it will be described below, and it moves upward together with the latter when the mould is opened, thus releasing the central ejectors covered by the length adapter 29. The rod shaped length adapter 29 comprises an enlarged head 24 at its outer end. The upper mould half 30 contains a guide rail 55 slidingly engaged in a groove 56 of the lower mould half. The guide rail 55 comprises a bore 58 which is aligned to the gate runner 11 when the mould is closed. The bore 58 is narrowed towards the mould. This narrowing acts as a stop 60 for the head 24 of the length adapter 29. The bore 58 is internally threaded in order to receive a stud screw 62 for blocking the length adapter 29.

The gate runner 11 is fashioned with slightly more than its half into the upper mould half 30 which results in a slight undercut. Due to this undercut, the length adapter 29 is guided in the upper mould half and is moved upward together with the upper mould half on the opening of the mould. The sprue formed in the gate runner 11 which is also retained in this undercut must however be retained in the lower mould half. This is achieved, as it will be set forth below, by the shaping of the bores 13, supported by the slit formers 17 and the shrinking of the sprue which facilitates its pulling out of the upper mould half 30.

Finally, the lower mould half 1 further contains the two slit formers 17. It is evident that the prolongation 26 of the tape moulds 3 within the slider 5 comprises the same functional elements as the tape moulds 3, namely central ejector, slit former, gate runner and tooth moulds. The ejectors and the gate runner are also provided in the moulds for the stop elements of the slider 5, optionally in modified form. These functional elements are operated by actuating elements which are interrupted at the sliding surface of the slider with the mould and do therefore not impede the movement of the slider.

The upper mould half 30 is executed essentially mirror shaped regarding the tape moulds. As it can be seen from the longitudinal section in FIG. 2, the injection material supply is provided within the upper mould half. It comprises the hot runner 35 which receives the flow of injection material at one end through the opening 39 of the feeding pipe 38 (FIG. 3); the material flows in a direction towards the nozzle 43 next to the slider. The other end of the hot runner 35 is closed by appropriate, known means, e.g. by a screw cap. The moulds in the slider 5 are fed via the gate runner 11. The nozzles 41 to 43 are preferably separately controllable. When the length of the zip fastener is short, nozzle 41 or nozzles 41 and 42 are shut off. The position of nozzle 43 which is used for injection in all cases, defines thus the length of the shortest possible zip fastener which can be injection-moulded.

Figure 3:
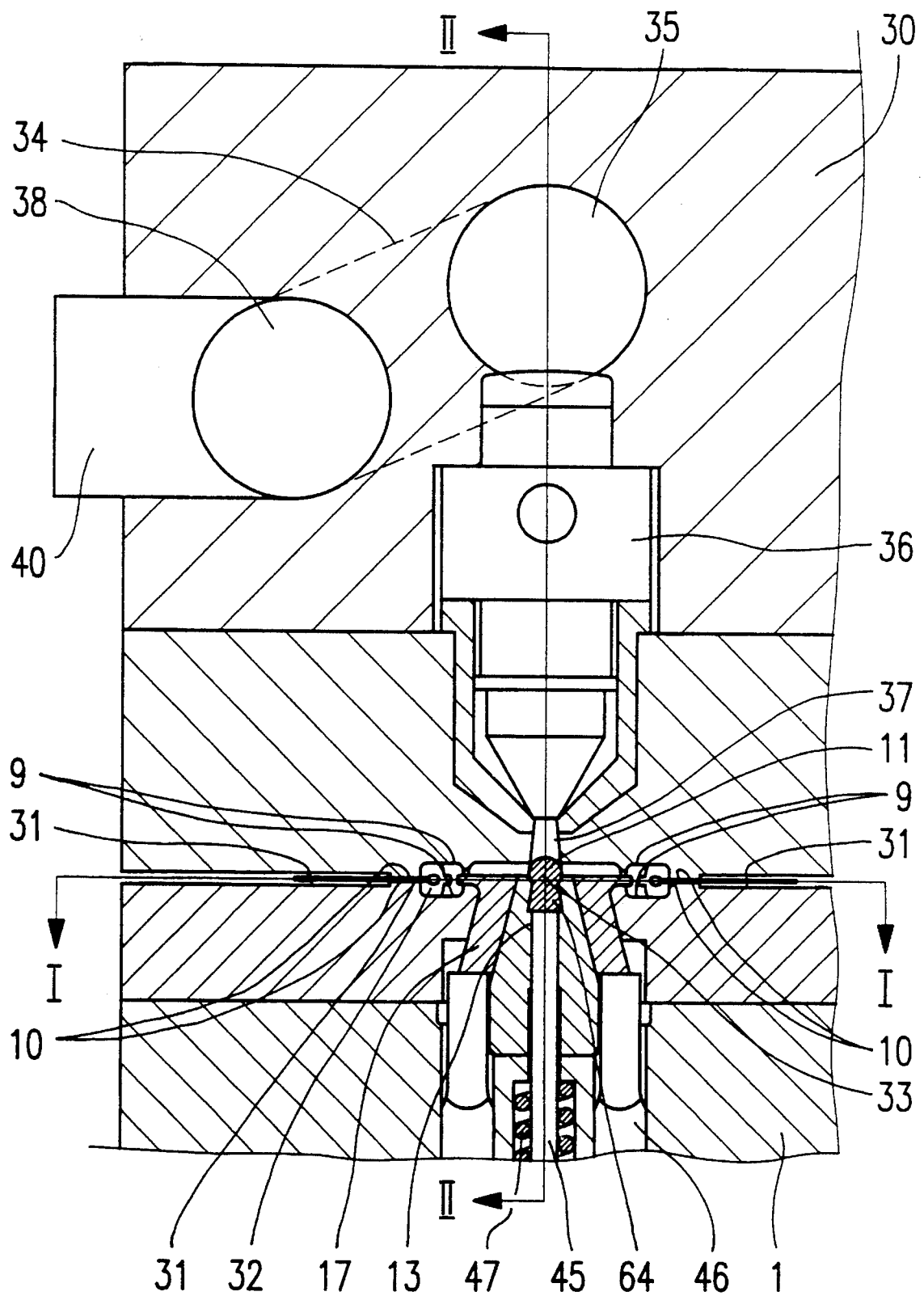
FIG. 3 shows a section according to the section line III—III in FIG. 1.

The hot runner 35 extends above the nozzles 41 to 43 and is connected, near the end of the mould opposite to the slider, via the connecting channel 34 to the feeding pipe 38 in which the injection material is fed through the connection 40 (see FIG. 3).

Figure 2:
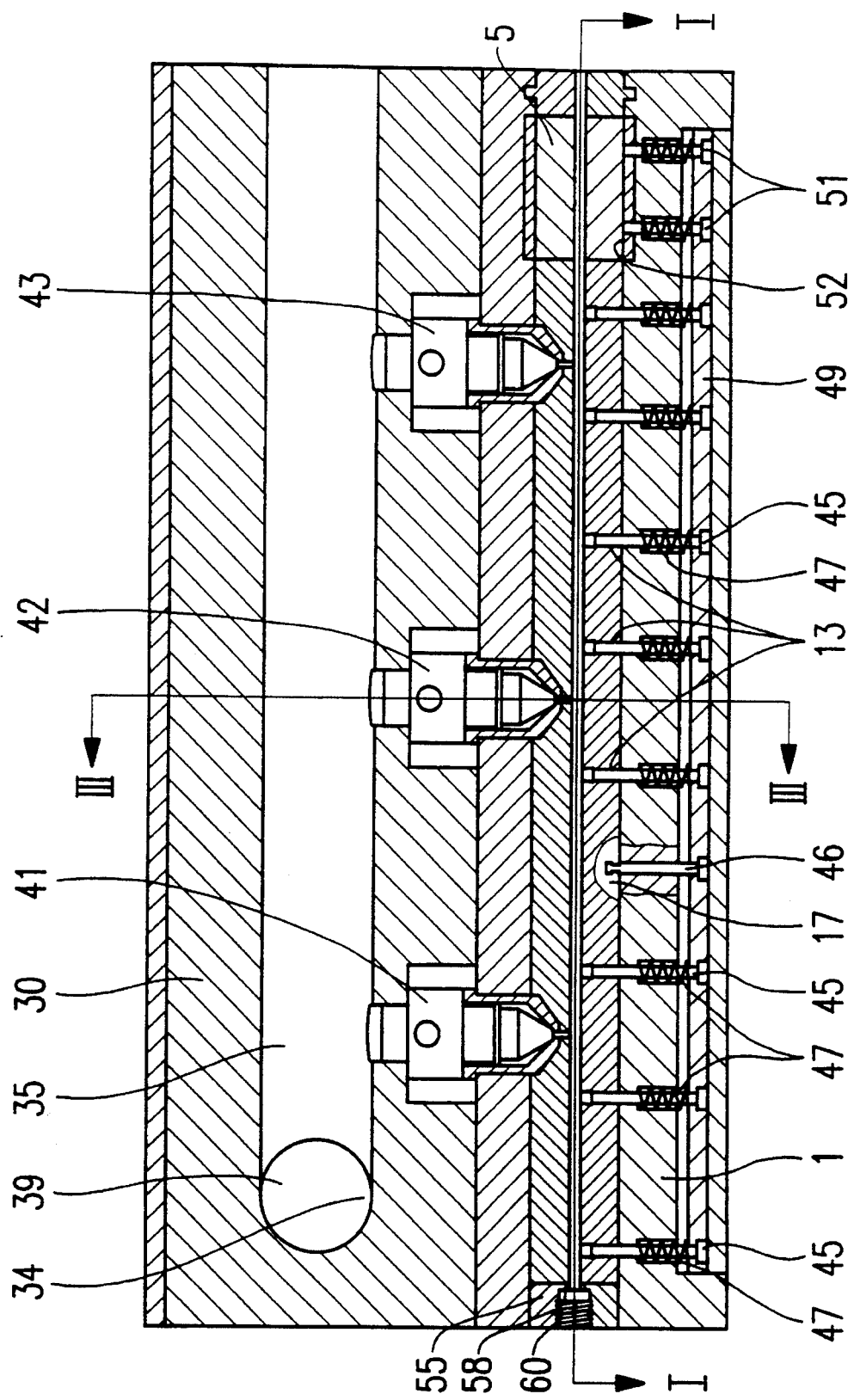
FIG. 2 shows a longitudinal section of the injection mould according to the section line II—II in FIG. 1.

FIG. 2 shows as a partially sectioned view the connection between the ejectors 46 and the slit formers 17 which is established by grooves, which are enlarged at the bottom, in the slit formers 17, the upper ends of the ejectors 46 being shaped as tenon blocks protruding into these grooves. The lower ends of the ejectors 45, 46 are held in a two-part ejector plate 49. Due to this construction of the connection of the ejector elements, the slit formers 17 are also forced back again into the position necessary for injection moulding without hindering the slit formers 17 to make their lateral movement described below.

The ejectors for the ejector elements in the slider 5 are partitioned into an upper portion if applicable present for each set of moulds, and a lower portion 51 connected to the ejector plate 49. In the retreat position of the ejectors, the lower portions 51 are retreated into the lower mould half or are planar with the sliding surface 52 of the slider 5 so that the latter is movable. During the actuating of the ejectors 45, 46, the lower portions 51 are inserted upward into the slider 5 and actuate the upper portions of the slider ejectors. The upper portions are secured against sliding out of the slider by suitable means and comprise own reset elements corresponding to the springs 47. As to the remaining features, the upper ejector elements mounted in the slider are constructed in the same manner as those of the tape moulds 3 or, respectively, they are adapted to the special requirements of the stop elements. These ejector elements are not shown in FIG. 2 which shows an intermediate position of the slider 5.

FIG. 3 shows a section across the mould after the injection of the injection material. The central ejectors 45 and the lateral ejectors 46 which act on the slit formers 17 are arranged in the lower mould half 1. Restoring springs 47 which retract the ejectors into the position shown when the mould is closed, are arranged around the central ejectors 45. In their retreated position, the ends of the central ejectors 45 are somewhat retreated into the bores 13. The free space thus formed is enlarged downward. Sprue pegs 64 are formed in this space which act as extractors on the opening of the mould and which extract the sprue from the upper mould half 30 since the gate runner is arranged at somewhat more than its half in the upper mould half 30, i.e. the mould partition plane lies somewhat beneath the center of the sprue resulting in a slight narrowing of the opening of the upper mould portion of the gate runner 11. It is designed in such a manner that, on one hand, the length adapter 29 is safely withdrawn by the upper mould half on opening and, on the other hand, the sprue can still be extracted. The narrowing is typically nearly invisible as it can be seen in the Figures. For example, the mould partition plane may be displaced downward by about 0.2 mm when the gate runner has a diameter of 2 mm. The extraction is facilitated by the normal shrinking of the injection material on cooling.

In the tape moulds 3, the zipper tapes 31 are pinched between the tape supports 10 of the lower and the upper mould half 1 and 3, respectively, so that no material may escape during the injection step. They bear the teeth 32 which have been moulded in the tooth moulds 9. The teeth 32 are still connected to each other after moulding by the sprue 33 which is removed later on by torsion, cutting or other, known techniques. Vertical nozzle runners 37 connect the nozzles 41 to 43 to the central gate runner 11.

Figure 4:
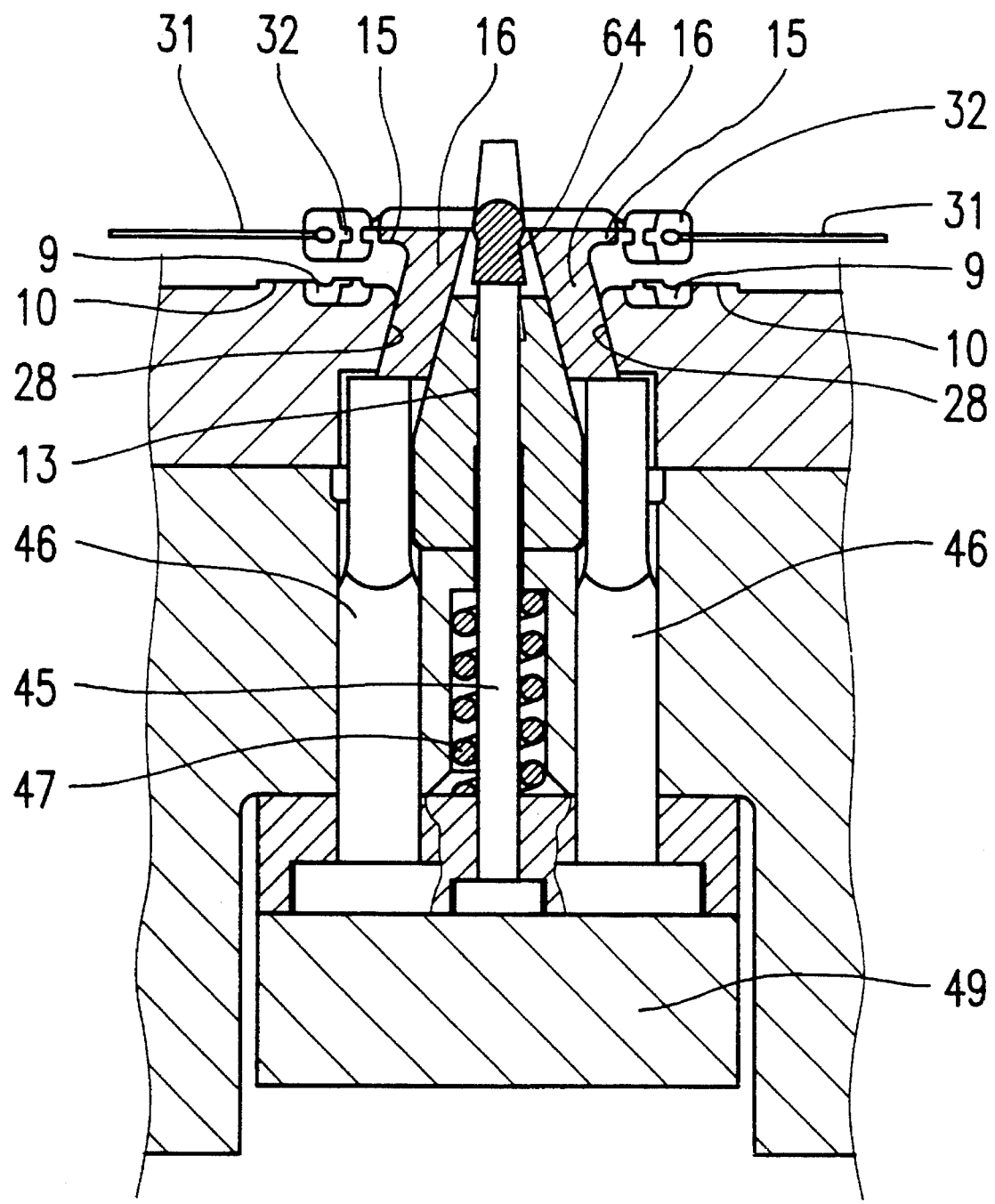
FIG. 4 shows a section like that of FIG. 3, the mould, however, being opened and the ejector pushed out.

FIG. 4 shows the opened mould with actuated ejectors 45 and 46. The two mould halves 1 and 30 are separated from each other, and the ejectors 45 and 46 have moved upward with respect to the lower mould half 1. The slit formers 17, which have also been displaced upward, have made a lateral movement too, away from the corresponding rows of teeth, and guided by the slots 28, so that the zip fastener lies now freely on the central ejector 45 and can be removed from the mould. This lateral movement of the slit formers 17 must happen simultaneously with the movement of the ejectors in order to achieve a rapid and safe ejection process. The slit formers 17 are shaped for this purpose as strips having an approximately L-shaped cross section, this L having however an angle between the base 15 and the leg 16 significantly different from 90°, the leg being lodged within the slot 28 for lateral reciprocating sliding movement. A preferred angle is in the range of from 50° to 85° and amounts for example to about 75°.

After the injection moulding of the teeth, the zip fastener still requires a kind of stops, namely top stops in the present embodiment. The zip fastener is therefore typically transported from the tape moulds 3 to the other side of the slider 5, and the last two teeth are inserted into the positioning aids 7 while two new support tapes are laid into the mould. During the next injection process, a new zip fastener having teeth and one kind of stops is injection-moulded in the tape moulds 3, and the still needed end stops of the zip fastener produced before are now injection moulded.

By means of a suitable control, zip fasteners having very different lengths can be produced in a continuous process. The shortest length is defined by the position of the nozzle 43 since the length adapter 29 can be introduced up to this nozzle without completely interrupting the injection material flow. Since the injection material is flowing over and beyond the nozzles 41 and 42, now inactive, it is guaranteed that no material will stay during prolongated time periods above these nozzles which material could age or decompose.

The greatest possible length in an injection process is obviously defined by the length of the tape moulds 3. A typical upper limit is a length of the tape moulds of about 650 to 700 mm which does however not constitute any limiting borderline for the purposes of the present invention. Zip fasteners having a greater length are produced in several succeeding injection steps, the slider 5 being displaced into its second end position wherein its tooth moulds 26 are used in order to prolongate the tape moulds 3. Thus, zip fasteners having any desired length may produced in this way.

Any modifications of the invention are evident to the man skilled in the art from the study of the present disclosure, without leaving the scope of the invention. It is for example imaginable to provide the slider 5 with more than three or with different moulding units, and this does neither exclude the use of a slider having only two moulding units. It would also be possible to provide a single, fixed stop mould. The ejectors may also be designed for a spotwise action, for example as a row of pins, and the leg of the slit former may be designed, instead of a strip sliding in a slot, as pins sliding in bores in the lower mould half. Instead of the sliding surfaces between the lateral ejectors 46 and the slit formers 17, one may imagine rollers, cylinders or similar devices. It will also be possible to select another number of nozzles than three, particularly one single nozzle.

The ejectors and connections and actuating devices of these elements may be varied within broad limits in using the embodiments known in the technique, as far as the lateral mobility of the slit formers with respect to the ejectors 46 is not impaired. Already known constructions may in particular be used for the central ejector. The ejector elements, such as the ejector strip and/or the slit formers may also be designed to fall back freely or under the action of own restoring elements when the ejectors retract.

One may further imagine a length adapter adjustable at any time, for example in executing the length adapter in principle as a rod having the length of the tape moulds and being positioned in the gate runner by a suitable drive. This would render possible the adjustment of the length of the zip fasteners separately for every injection process without interruption. It is also possible to guide the length adapter within the upper mould half in any other way than the undercut described, for example by guide grooves or strips.

The mould itself is not limited to the manufacture of slit-type zip fasteners of the described type, it is also possible to produce other zip fasteners through the adaption or the omission of the slit formers, for example staggered teeth zip fasteners.

The slider stop elements 22 may also be fixed to the mould by a plug-in or a bayonet connection.

The materials to be injection moulded may be the currently used ones, well known to the men skilled in the art of injection moulding.

I claim:

1. A device for the manufacture of at least one tape of a zip fastener, said tape comprising zipper teeth having a base and a head, said base being fastened to said tape and said heads comprising a slit, the device comprising an injection mould containing at least one row of moulds for shaping the teeth of a zip fastener and at least one slit former for shaping slits in the heads of the teeth, the mould further having a mould partition plane extending about centrally through the tooth moulds, said at least one slit former comprising a slit shaping portion and furthermore a guide portion which is slidingly guided within a double acting guide element arranged within the injection mould obliquely to the ejection direction and complementarily to said guide portion of the slit former, further comprising ejectors movable in an ejection direction, one end thereof comprising tenon blocks movably inserted into undercut grooves of the guide portions of the slit formers, said grooves being cut in parallel to the plane defined by the moving direction of the guide portions and the ejection direction, thus allowing the transmission of traction and pressure forces from the ejectors to the slit formers and enabling the oblique movement of the slit formers with respect to the ejection direction by a sliding movement of the tenon blocks within the respective grooves.

2. An injection mould for the manufacture of a zip fastener comprising at least one tape mould containing a plurality of tooth moulds and a slider containing at least two sets of moulds, for top and bottom stop elements and for zip fastener tapes, said slider being movable transversely to the row of the tooth moulds and comprising at least one mould for at least one zipper tape which essentially consists of tooth moulds, the injection material being feedable by at least two nozzles from a hot runner to a gate runner extending along the tooth moulds from which said injection material can get into at least one tooth mould and into the moulds within the slider, the slider being disposed at one end region of the tape moulds, said hot runner extending from the nozzle furthest away from the slider towards the slider, the opening of the hot runner for the feed of injection material being disposed at the end of the hot runner furthest away from the slider.

3. The injection mould of claim 2, wherein the gate runner is closable at a determined distance from the slider in function of the length of the zip fastener to be injection moulded, by a length adapter arranged within the gate runner.

4. The injection mould of claim 3, wherein the length adapter fills up the gate runner and is arranged to be put in from the end of the mould furthest away from the slider.

5. The injection mould of claim 3, wherein the length adapter is held by at least one of the group consisting of means for supporting said length adapter and means for guiding said length adapter within the upper mould half.

6. The injection mould of claim 2, wherein the nozzles are individually and separately controllable.

7. The injection mould of claim 2, wherein the slider comprises at least three sets of moulds and the mould comprises an interchangeable stop for the slider, the interchanging of said stop allowing the selection of at least two end positions of the slider, and in each of the positions being another one of the mould sets of the slider in the desired position for injection moulding.

\* \* \* \* \*